(12) United States Patent
Super et al.

(10) Patent No.: US 10,085,458 B2
(45) Date of Patent: Oct. 2, 2018

(54) SYSTEM AND METHOD OF PRODUCING PRINTED DECORATIONS

(71) Applicant: DECOPAC, INC., Anoka, MN (US)

(72) Inventors: Susan Super, Coon Rapids, MN (US); Paul Dudoy, Ben Luc (VN)

(73) Assignee: DECOPAC, INC., Anoka, MN (US)

( * ) Notice: Subject to any disclaimer, the term of this patent is extended or adjusted under 35 U.S.C. 154(b) by 954 days.

(21) Appl. No.: 14/528,770

(22) Filed: Oct. 30, 2014

(65) Prior Publication Data

US 2015/0125573 A1 May 7, 2015

Related U.S. Application Data

(60) Provisional application No. 61/898,876, filed on Nov. 1, 2013.

(51) Int. Cl.
*A21D 13/47* (2017.01)
*A21D 13/00* (2017.01)
*A21D 13/48* (2017.01)

(52) U.S. Cl.
CPC ......... *A21D 13/0087* (2013.01); *A21D 13/47* (2017.01); *A21D 13/48* (2017.01)

(58) Field of Classification Search
CPC ......... A21D 13/47; A21D 13/48; A23P 20/10; A23P 20/15; A23P 20/18
USPC ............................ 426/383; 428/32.1, 195.1
See application file for complete search history.

(56) References Cited

U.S. PATENT DOCUMENTS

| | | | |
|---|---|---|---|
| 7,360,853 B2 * | 4/2008 | Barss | B41J 25/308 347/8 |
| 8,172,099 B1 * | 5/2012 | Hardy | A47B 43/00 211/195 |
| 9,044,037 B2 | 6/2015 | Ream et al. | |

\* cited by examiner

*Primary Examiner* — Bruce H Hess
(74) *Attorney, Agent, or Firm* — Gardella Grace P.A.

(57) ABSTRACT

A process of producing printed decorations includes providing a gumpaste mixture, creating a plurality of blanks from the mixture, arranging the plurality of blanks onto a platen of a printer, printing a pattern on the plurality of blanks, after the printing, removing the plurality of blanks from the platen, and forming each blank of the plurality of blanks into a shape of a decoration.

20 Claims, 12 Drawing Sheets
(6 of 12 Drawing Sheet(s) Filed in Color)

SYSTEM AND METHOD OF PRODUCING PRINTED DECORATIONS

CROSS-REFERENCE TO RELATED APPLICATION

The present application is a non-provisional of and claims priority to U.S. Application No. 61/898,876, filed Nov. 1, 2013, the entire contents and disclosure of which are incorporated herein by reference.

BACKGROUND

Decorated food products, such as cakes, are popular items, particularly for special occasions, such as birthdays, holidays, weddings, anniversaries and other celebratory events. It is often desirable to customize these items with decorations added to the food product in order to increase the appeal of the food product or to tailor for a special occasion. For example, the decorations can be in the shape of a flower, a balloon, a bow, a licensed character (e.g., cartoon, fantasy figure), etc.

One type of food decoration is known as a sugar or gumpaste decoration (hereinafter referred to as a gumpaste decoration). Gumpaste decorations are made from materials typically considered to be food ingredients, e.g., confectionary powdered sugar, tapioca flour, gelatin, FD&C food colors, and preservatives (e.g., potassium sorbate). Designs of gumpaste decorations range from simple, plain two-dimensional shapes (e.g., hearts, balloons, etc.) to very ornate, very colorful three-dimensional objects (e.g., flowers, character figurines). FIG. 1 shows exemplary gumpaste decorations in the shape of a bow.

The physical characteristics of the gumpaste material allow for very detailed designs and configurations. Some gumpaste decorations are mounted on wires to provide shape, support, and decorative elements. Gumpaste decorations can be manufactured and sold in a white color or the gumpaste may be colored during the manufacturing process and sold as a solid color (e.g., red roses). The gumpaste decoration may be placed on the food in its as-received color or it may be painted to provide color. Some gumpaste decorations, either white or colored, may be painted before or after assembly, either by hand with a brush or by airbrush. The most ornate gumpaste decorations may be comprised of a combination of material elements, including but not limited to: white and/or colored substrate (e.g., white flower and green petals), paint applied before and/or after assembly (including hand and/or airbrush painting), wire inclusion either as a structural/skeletal frame and/or as a design feature (e.g., flower stems).

Some food decorators consider gumpaste decorations to be edible due to their ingredients. Others consider them to be nonedible decorations due to their hard, brittle texture and the imbedded wires in some decorations.

The gumpaste is mixed in equipment typically used for food production and is then sheeted or rolled to the desired thickness, either by hand or mechanically. If a uniform color is desired, the gumpaste may be colored during mixing. Shapes are cut from the sheet, either by hand or using a template or cutter similar to a cookie-cutter. These blanks are formed to the desired end configuration, either by freehand or using forms, and may be mounted on wires. The final configuration may be painted, either by hand with a brush or with an airbrush. The finished decoration is then dried to a specific moisture content, usually in a heated, forced air oven.

Gumpaste decorations may be made from scratch by an individual decorator. This is a very labor and time consuming approach, especially for commercial or production bakeries. Many premanufactured gumpaste decorations are sold to decorators in a raw, uncolored state so that the decorator may use their artistic/craft skills to finish the decoration. This approach is still very labor and time intensive and requires a high degree of skill. Alternatively, highly detailed, painted and formed gumpaste products are also available in a finished form. These lovely creations can be quite expensive and require significant hand-labor to produce. The problem with any of these scenarios is that the production of gumpaste decorations requires significant, highly-skilled, costly labor for painting and decoration.

BRIEF SUMMARY

One or more of the exemplary embodiments herein describe a process of producing printed decorations includes providing a gumpaste mixture, creating a plurality of blanks from the mixture, arranging the plurality of blanks onto a platen of a printer, printing a pattern on the plurality of blanks, after the printing, removing the plurality of blanks from the platen, and forming each blank of the plurality of blanks into a shape of a decoration. The details of one or more implementations are set forth in the accompanying drawings and description below. Other features, objects, and advantages will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
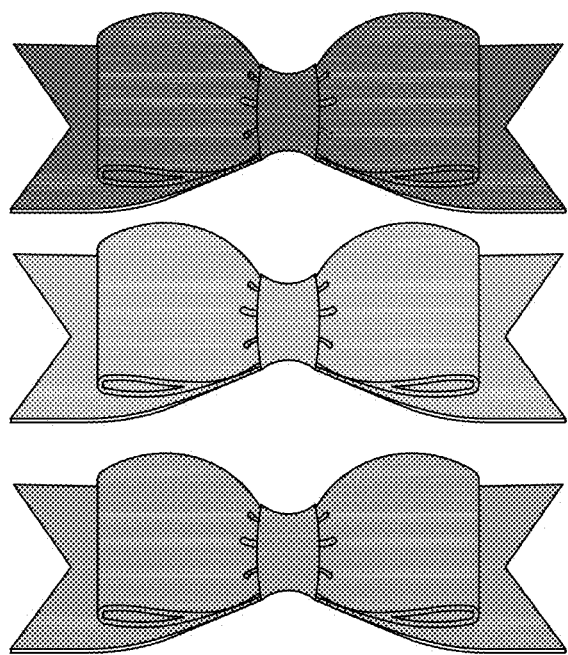
FIG. 1 shows conventional gumpaste decorations.
Figure 2:
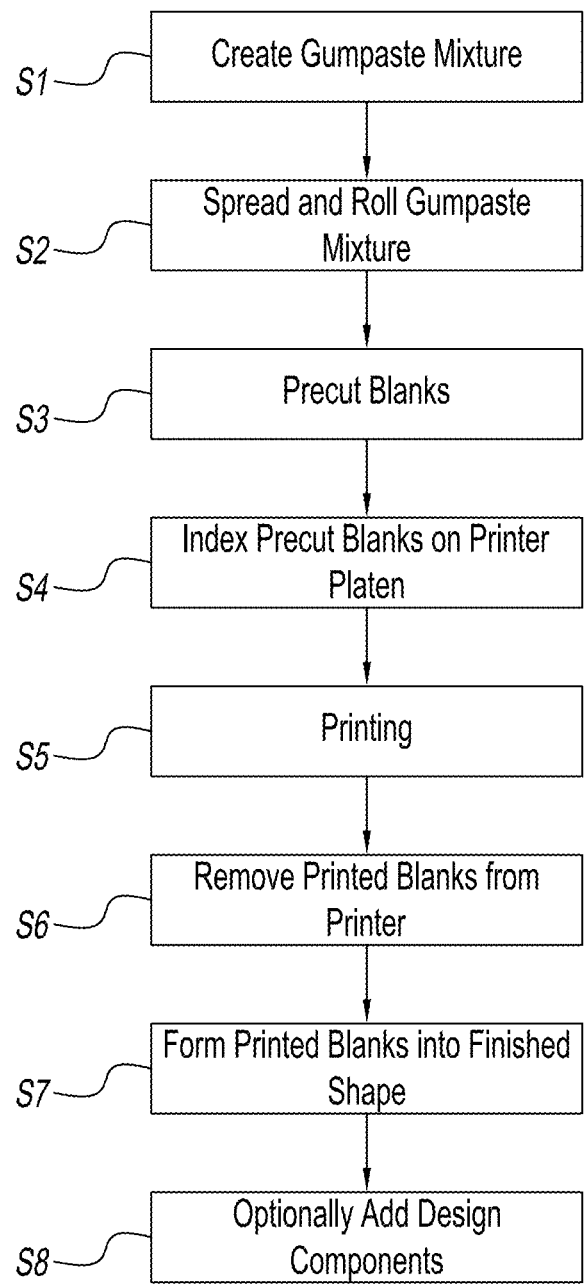
FIG. 2 shows an exemplary embodiment of a process for creating gumpaste decorations.

FIG. 2 is an exemplary process for creating gumpaste decorations. The process includes a step S1 of creating the gumpaste mixture. The gumpaste mixture is made from a combination of materials typically considered to be food ingredients, including but not limited to: water, confectionery powdered sugar, tapioca flour, gelatin, FD&C food colors, and preservatives (e.g., potassium sorbate). Edible color may be added to the mixture to result in uniformly colored substrate. An exemplary gumpaste mixture can include about 50% by weight to about 60% powder sugar or any value or range therebetween (e.g., about 51%, 52%, 53%, 54%, 55%, 56%, 57%, 58%, and 59%), about 25% to about 35% tapioca flour or any value or range therebetween (e.g., about 26%, 27%, 28%, 29%, 30%, 31%, 32%, 33%, and 34%), about 4.5% to about 6.0% palm kernel flakes or any value or range therebetween (e.g., about 4.6%, 4.7%, 4.8%, 4.9%, 5.0%, 5.1%, 5.2%, 5.3%, 5.4%, 5.5%, 5.6%, 5.7%, 5.8%, and 5.9%), about 3.5% to about 5.0% water or any value or range therebetween (e.g., about 3.6%, 3.7%, 3.8%, 3.9%, 4.0%, 4.1%, 4.2%, 4.3%, 4.4%, 4.5%, 4.6%, 4.7%, 4.8%, and 4.9%), about 0% to about 0.5% potassium sorbate or any value or range therebetween (e.g., about 0.1%, 0.2%, 0.3%, and 0.4%), and about 0% to about 0.5% edible ink or any value or range therebetween (e.g., about 0.1%, 0.2%, 0.3%, and 0.4%).

The ingredients can be combined and mixed in a mixing machine. Prior to drying, the mixture is soft and plastic, such that is it easy for bending, molding, and prevents cracking. The gumpaste is mixed again to de-gas and create a consistent, smooth finish. The quantity of each ingredient can be adjusted to allow for appropriate texture and firmness for printing on and forming decorations prior to drying to a hard, finished product.

Next, in step S2, the gumpaste mixture is spread onto a sheet and rolled, if necessary, to form a substrate of a desired thickness for the decoration to be produced. For example, the gumpaste mixture can be passed through a sheeting machine to create a uniform sheet. The gumpaste mixture goes through four stages (rough, medium, fine, and very fine stages) while being spread into a sheet. In an exemplary embodiment, a bow decoration passed through a sheeting machine until it is approximately 0.12 inches thick. The desired thickness is selected based on the overall design of the decoration or for individual pieces of the finished product. The mixture can be spread to a constant predetermined thickness or can be spread to more than one predetermined thicknesses.

In step S3, blanks are precut from the sheeted substrate. The blanks can be cut using a template cutter or by hand to the desired shape based on the decoration being created. In another exemplary embodiment, the numerous blanks can be cut simultaneously by a semiautomatic cutting machine. For the bow decoration example, three different shapes can be cut from the same substrate to assemble the bow: 1) a base; 2) a bow top; and 3) a knot or ribbon to wrap the base and bow top together. After the blanks are cut from the sheeted substrate, the excess substrate not included in the blanks is removed and recycled back into the mixture.

Next, in step S4, the precut blanks are manually placed on outlines on a printer platen to index for printing. The outlines are created on a computer and then tested by printing the outlines on plain white paper. Once the outlines are shaped correctly, the final template is created on an aluminum tray with edible marker showing the outlines for placement of the blanks for printing.

The outlines ensure proper location of the blanks on the printer platen. In certain embodiments, the outlines can have the same or similar pattern as the pattern to be printed on the precut blanks. This provides a visual clue to help the operator position the precut blanks on the outlines.

Figure 3A:
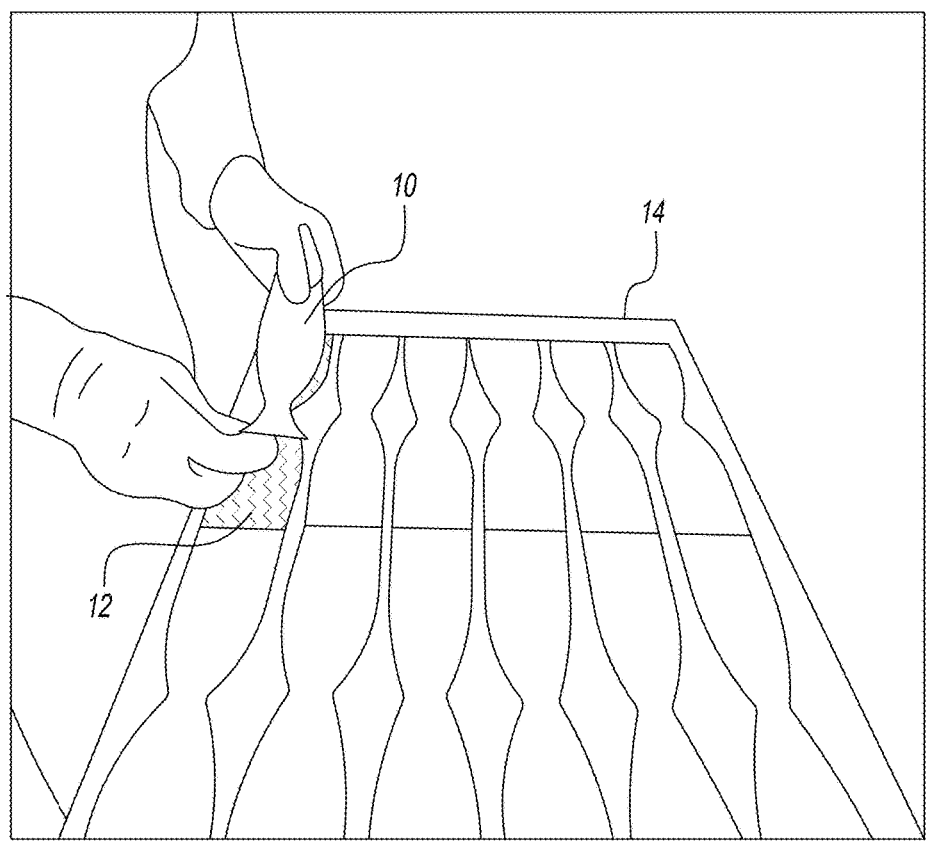
FIGS. 3A-3G show an exemplary bow decoration at various stages of creation.
Figure 3B:
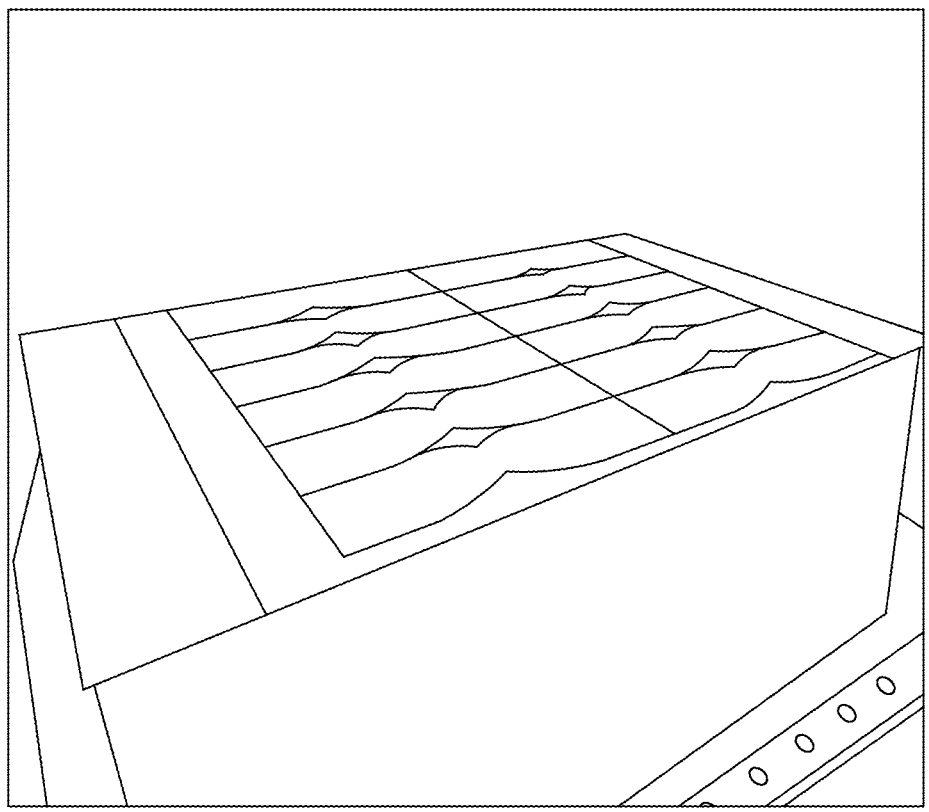

FIGS. 3A-3G show an exemplary bow decoration at various stages in the process described herein. FIG. 3A shows the blanks 10 cut from substrate, and then placed onto the outlines 12. FIG. 3B shows the blanks 10 and the outlines 12 loaded onto a printer platen 14.

After the precut blanks are loaded onto the printer platen, the printer is activated in step S5. The printer scans the precut blanks for the correct location in the length and width (X and Y axis) orientation and the appropriate height (Z axis) and adjusts the proximity of the printhead to the platen before printing. This scanning can be laser-guided. After the initial indexing, the printer prints designs/shapes/patterns onto the precut blanks using edible inks, similar to those described in U.S. Pat. No. 7,608,141, the entirety of which is incorporated by reference herein. Alternatively, the edible inks can be confectionary inks similar to those available from Colorcon® (http://www.colorcon.com/products-formulation/all-products/food-confectionery/confectionery-inks). These inks are used to fill four of the five cartridges of the printer (cyan, yellow, magenta, black). The fifth cartridge of the printer, which is intended for a matte black color, is filled by the manufacturer with a proprietary formula comprised of the following colors; red, yellow, blue, and purple.

Figure 3C:
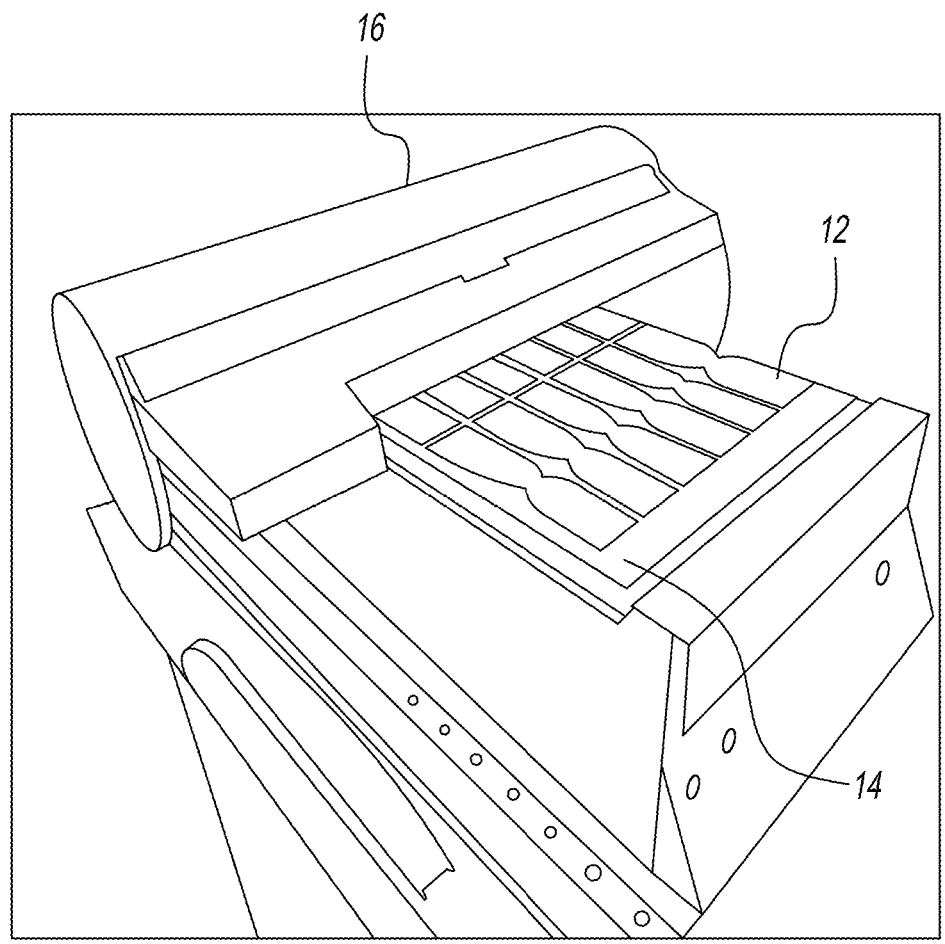
Figure 3D:
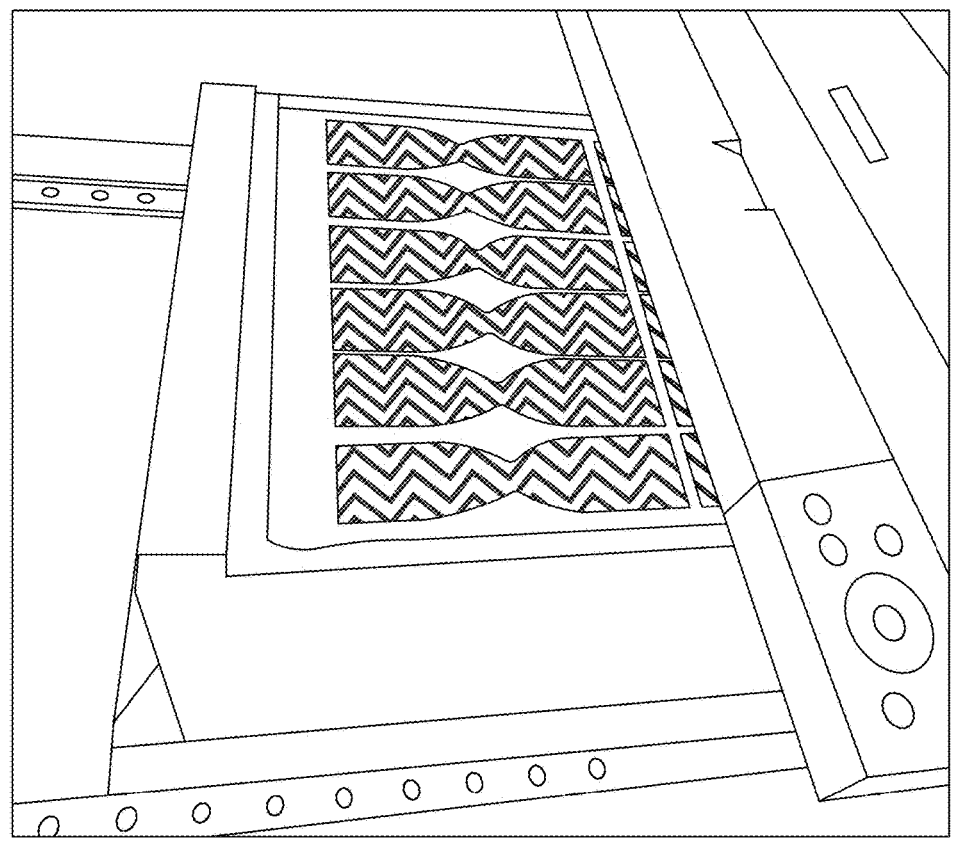

The printer 16 moves relative to the platen 14 to print the desired pattern on the blanks 12, as shown in FIG. 3C. For example, the printer can print a zig-zag pattern 16 with red ink on the precut blanks 12 of the bow decoration, as shown in FIG. 3D. This automatic printing provides a significant reduction in labor required to produce the bow decoration compared with the conventional methods of hand painting or painting with an airbrush.

Figure 4:
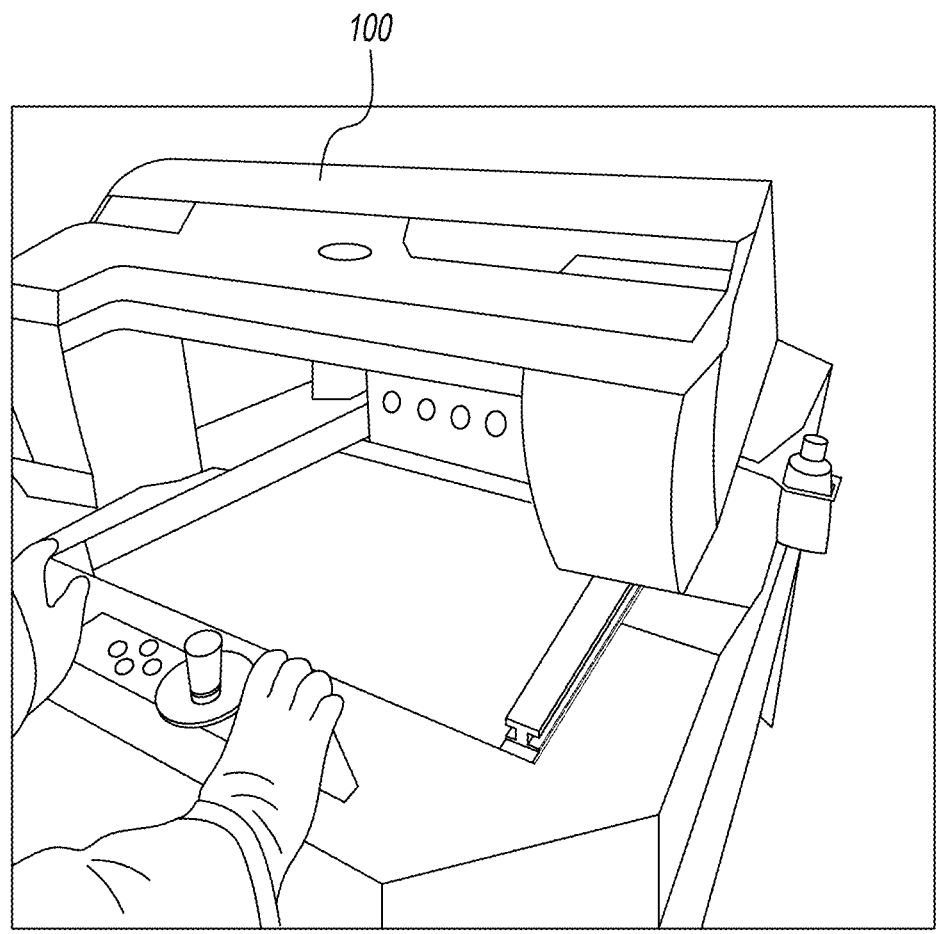
FIG. 4 shows an exemplary printer.

FIG. 4 shows an exemplary printer. The printer 100 is a conventional heavy-duty industrial printer, such as Canon Model IPF510, or an equivalent later model, purchased from MasterPiece Systems Co. LTD, that has been modified. The specifications for Canon Model IPF510, prior to the modifications discussed below, are attached hereto as Exhibit A. The printer includes a table 102 with a platen 104 positioned on the table to replace the paper feed mechanism of the conventional printer. The printer body, with paper feed and rollers removed, is mounted to the table above the platen, which indexes the food blanks and moves product beneath the printhead of the printer in response to commands from the printer similar to the way paper is moved through a conventional printer. Thus, similar to a conventional printer, the printer 100 is stationary while the precut blanks are moved beneath the printer via the platen. In an exemplary embodiment, the platen can be mounted on a system of rails and motors move the platen along the rails.

As discussed further below, the printer will begin operation to produce the gumpaste decorations in response to an order for a pattern. The pattern order can be entered by a user from a computer directly connected to the printer, or the pattern order can be placed remotely, for example, via PhotoCake® by DecoPac, Inc., as described in U.S. application Ser. No. 12/852,988, the entirety of which is incorporated herein by reference. Some pattern orders will be specific to a customer and some will be warehoused for general sale.

Figure 5:
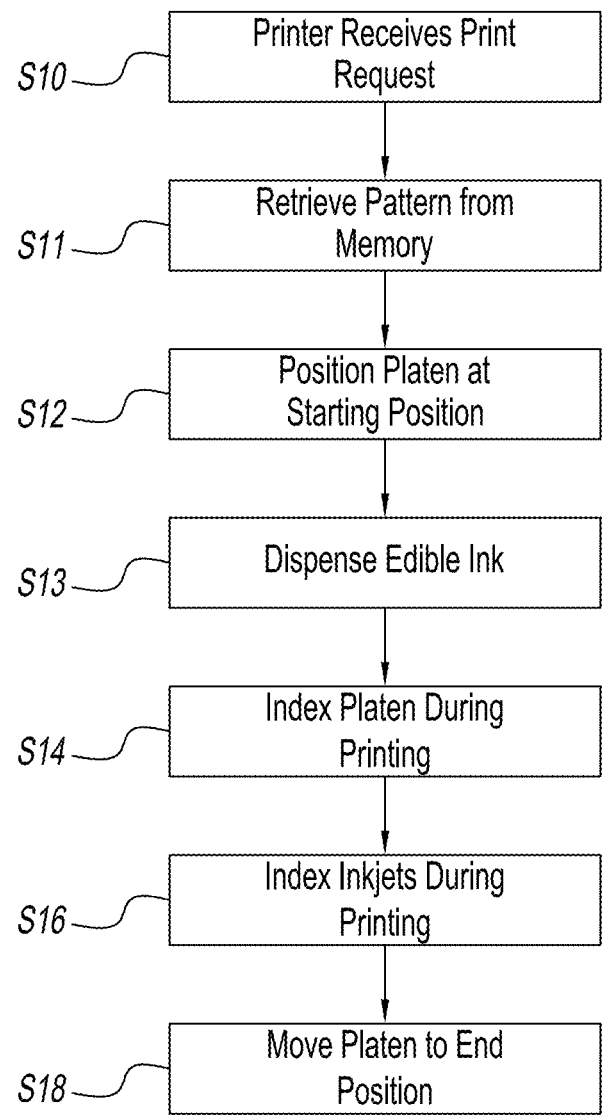
FIG. 5 shows an exemplary printing process.

A process for printing on the blanks is now described, as shown in FIG. 5. In response to input to the printer in step S10, such as a command from a computer connected to the printer, to print a predetermined pattern on the blanks, the printer retrieves the requested pattern from a memory in step S11. The pattern can be newly created by a user, a stock pattern from a database, public domain artwork, bespoke art, etc.

After the pattern is retrieved, the printer positions the platen at a start position in step S12 and commences dispensing edible ink from inkjets of the printhead of the printer in step S13. During printing, the printer indexes the platen in step S14 so that the blanks are fed underneath the printhead in a feeding direction. The inkjets are moved in a side-to-side direction within the printer in step S15, perpendicular to the feeding direction, if necessary for the desired pattern. The indexing of the inkjets can be done simultaneously or sequentially with the indexing of the platen. Once the pattern is complete, the platen is moved out from underneath the printer in step S16 to an end position so that the printed blanks can be removed from the printer.

In an alternative process, the platen may remain stationary while the inkjets are moved in the side-to-side direction and the printer is moved with respect to the platen in the feeding direction. In an exemplary embodiment, the printer can be mounted on a system of rails and motors move the printer along the rails.

The pattern or geometric shape printed on each blank in a single printing pass can be the same. Alternatively, two or more of the blanks on the same printer platen can be concurrently printed with different patterns or geometric shapes in the same printing pass, for example, to create a set of bows having a variety of patterns or geometric shapes.

Figure 3E:
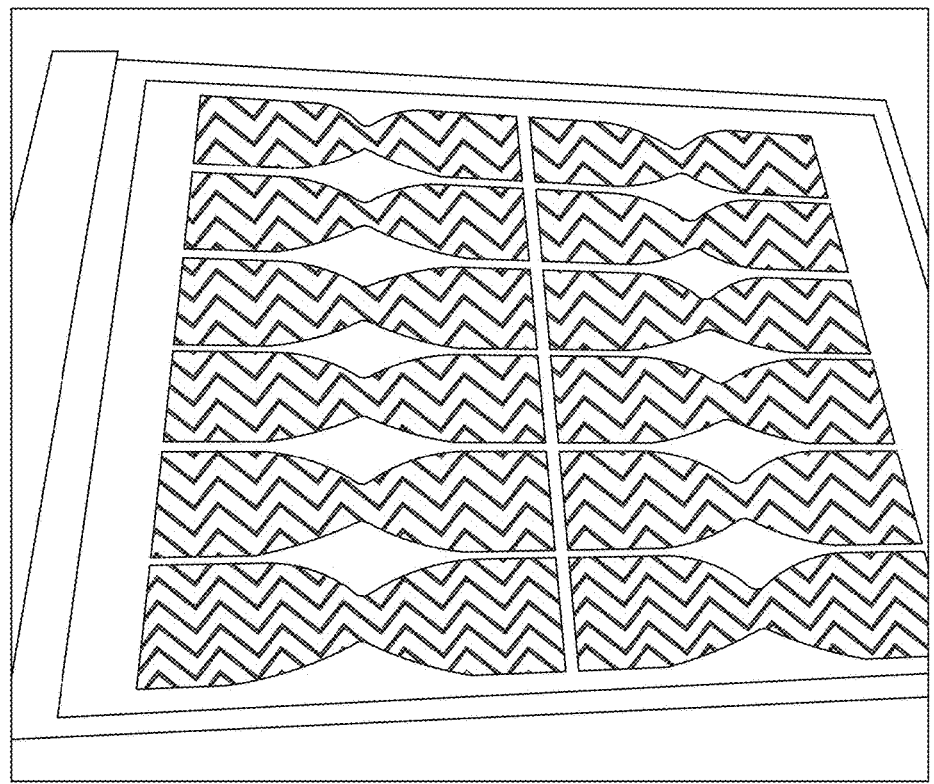
Figure 3F:
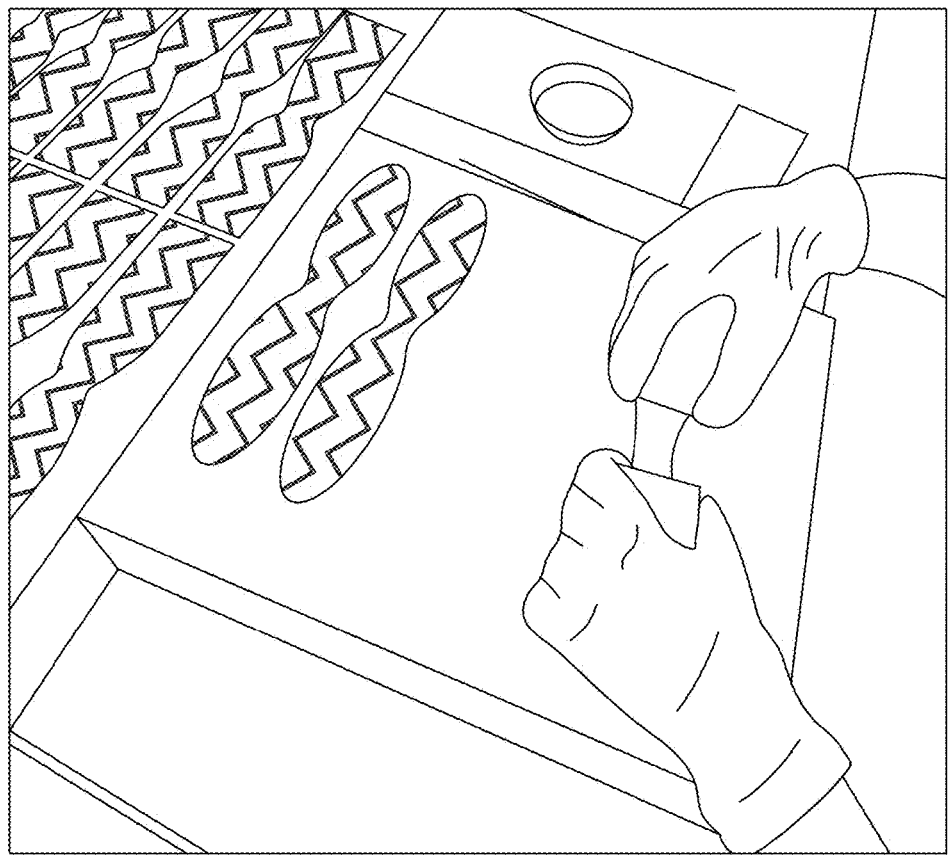
Figure 3G:
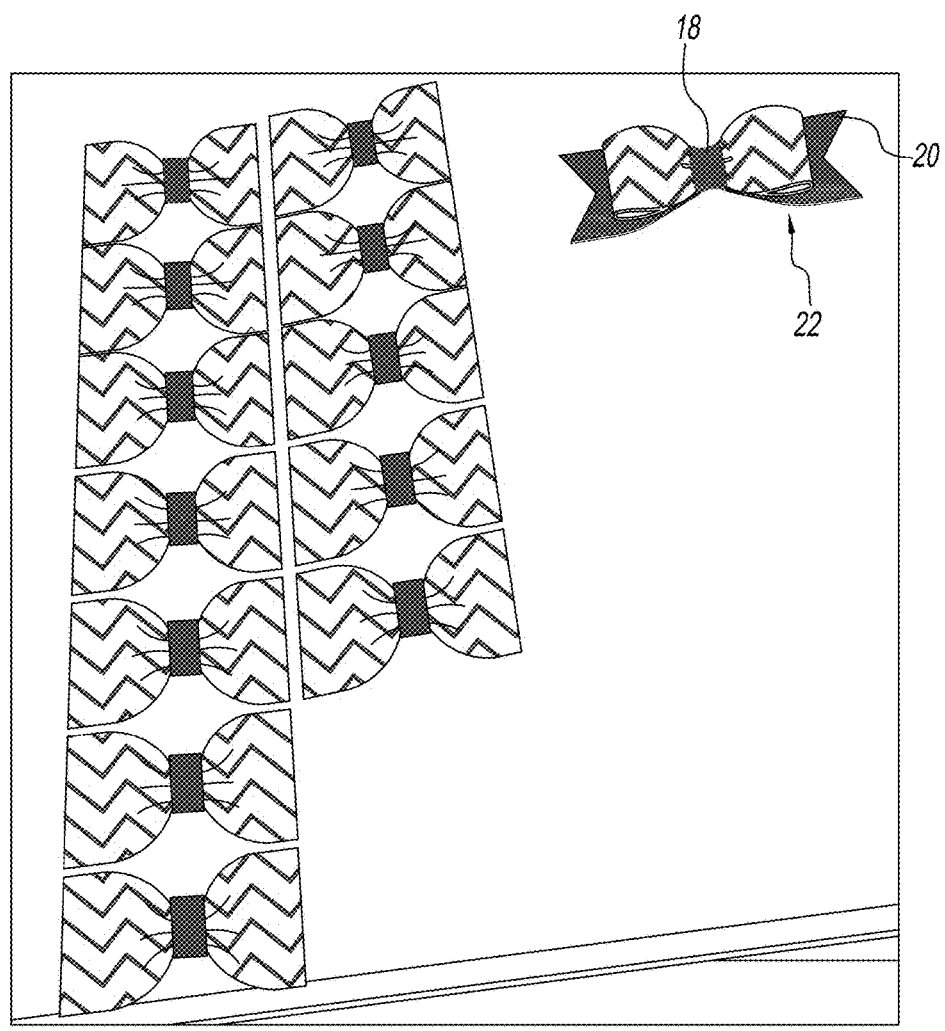

FIG. 3E shows a plurality of blanks 12 after the printing is complete. In the exemplary process, after printing, in step S6, the printed blanks are manually removed from the printer. Next, in step S7, the printed blanks are shaped into finished shapes while the material is still pliable. In order to make the bows into their finished shape, each printed blank 12 is bunched up on each end by moving the top and bottom edge of each end towards a center thereof, and then each end is rolled around a cylindrical object 18, as shown in FIG. 3F. A ribbon 20 is then added to the center of each bow to create the finished bow decorations 22, as shown in FIG. 3G. In an exemplary embodiment, the ribbon 20 is also made of gumpaste. The ribbon 20 could also be printed with a complimentary or contrasting color pattern. In other exemplary embodiments, the printed gumpaste decoration could be incorporated with other non-gumpaste elements such as a conventional ribbon, plastic pieces, etc. to create a finished decoration. The forming of the printed blanks into shapes can be done freehand and/or by arranging the printed blanks around a template such as a steel mold. A wire comprised of material determined by the USFDA to be safe as an Indirect Food Additive (as cited in 21 C.F.R. §§ 175-178) could also be added for support or as a decorative element.

Step S8 is an optional step depending on the desired end product, during which other design components are assembled and secured with the formed blanks. For example, when creating a bow decoration, a gumpaste ribbon can be wrapped around the center of the bow. In alternative examples, a wire stem can be added to a gumpaste flower, or fabric leaves can be added to gumpaste grapes.

Next, in step S9, the printed, shaped decoration is dried. In an exemplary embodiment, the decoration can be dried in an oven to drive off moisture and facilitate curing without cracking, checking or breakage. The oven includes high temperature brick as an insulator, similar to a traditional pizza brick oven. This insulator helps to trap the heat inside and regulate a consistent temperature provided by four heat blowers. The oven is about 500 sq. feet in size and the drying temperature is between 65° C. to 70° C. The humidity of the decoration before going into the oven is about 30-40%. After approximately 24 hours in the oven, the humidity is reduced to 5-8%.

In another exemplary embodiment, the completed gumpaste decoration is placed in a dehumidifying room overnight to lower the humidity to 20% or lower. In yet another exemplary embodiment, the completed gumpaste decoration is placed in a dehumidifying room overnight to lower the humidity to 25-35% or lower, and then the bow is placed into an oven with a temperature of 70° C. until the humidity reaches 5-7%. Before packaging, the decoration is placed into an ultraviolet room for disinfection. The decorations are then packaged to prevent breakage and are ready for delivery.

Figure 6:
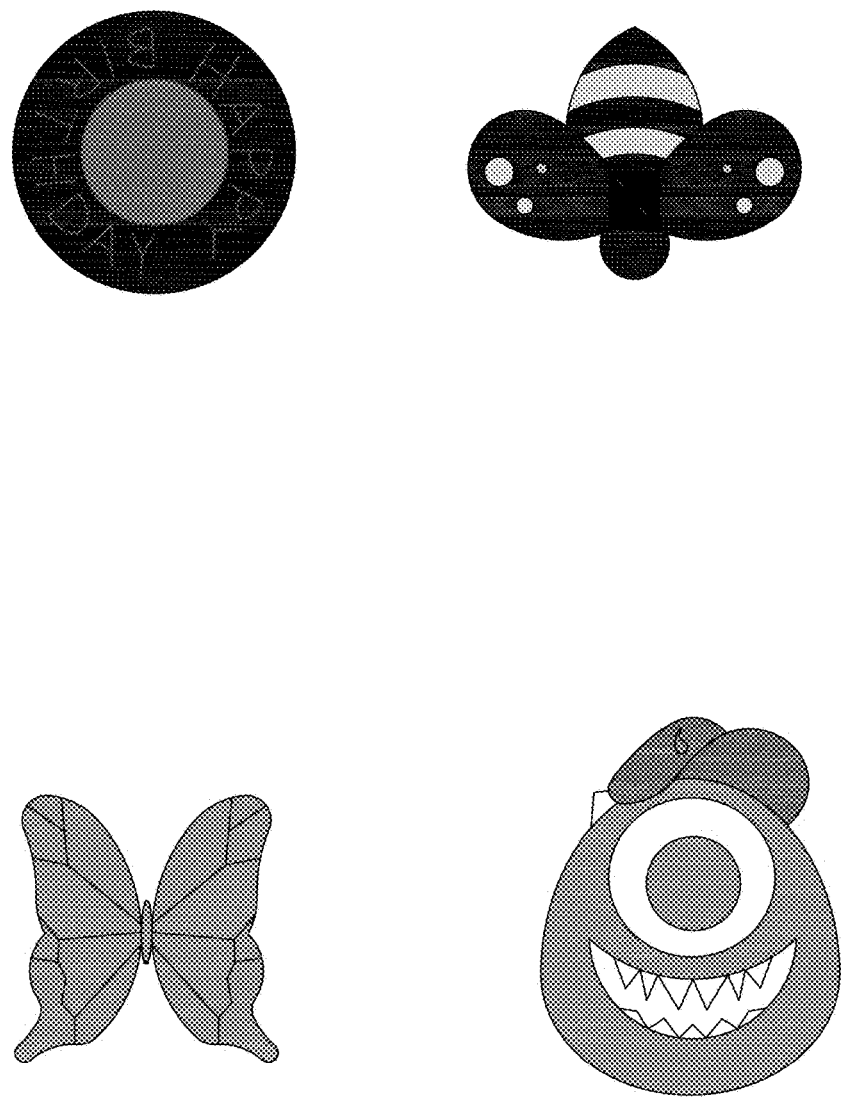
FIG. 6 shows a plurality of exemplary decorations produced by the process described herein.

Although an exemplary bow decoration was described above, other decorations could be produced by the exemplary process described herein. For example, the decorations can be in the shape of an animal, such as a butterfly, a flower, flower petals, a balloon, a book (e.g., the Bible), a religious symbol (e.g., cross), a sea shell, a star, food (e.g., grapes), a licensed character (e.g., cartoon, fantasy figure). FIG. 6 shows a plurality of exemplary decorations produced by the process described herein. Augmented reality markers could be printed on the decorations, or the exemplary decorations itself in its entirety, due to its irregular and/or unique shape, is a marker which allow the user to access to augmented reality content, as described in U.S. application Ser. No. 12/852,988, which was incorporated by reference above.

The exemplary process described above provides a substrate uniquely formulated to accommodate printing, via a printer modified for printing on food products with edible inks, and forming to the desired end configuration. The result is a gumpaste decoration with a printed pattern having improved consistency and detail over a decoration that has been painted by hand. Additionally, certain patterns or geometric details are achievable with the exemplary process described above that cannot be consistently achieved by hand, for example, a repeating geometric pattern. Thus, this process results in beautiful, shaped, colored gumpaste decorations that are produced with less hand-labor than conventional decorations.

A number of embodiments have been described. Nevertheless, it will be understood that various modifications are optionally made without departing from the spirit and scope of this disclosure. Accordingly, other embodiments are within the scope of the following claims.

APPENDIX A

Specifications
Main Unit Specs

| | |
|---|---|
| Printer Type | 5-Color 17-inch Printer |
| Number of Nozzles | Total: 15,360<br>MBK: 5,120 nozzles<br>C, M, Y, BK: 2,560 nozzles each |
| Nozzle Pitch | 1,200 dpi<br>Non-firing nozzle detection and compensation |
| Print Resolution (Up to) | 2,400 × 1,200 dpi (Max) |
| OS Compatibility | Windows XP/Server 2003/Server 2008/Vista/7 (32/64 bit), Macintosh OSX 10.3.9-10.6 (32 bit), OSX 10.5-10.6 (64 bit) |
| Standard Interfaces | USB 2.0 High-Speed<br>10/100 Base-T/TX<br>Optional: IEEE 1394 (Firewire ®) |
| Ink Droplet Size | 4 picoliter |
| Ink Capacity | 130 ml per color[2] |
| Ink Droplet Size | Dye/Pigment Reactive Ink |
| Color Set | Dye: Cyan, Magenta, Yellow, Black<br>Pigment: Matte Black (two channels) |
| Buffer Ram | 192 MB |
| Hard Drive | N/A |
| Media Width | Cut Sheet with Optional Roll Unit: 8"-17" |
| Media Thickness | Top Loading Manual Feed: 0.07-0.8 mm (2.8-31.4 mil)<br>Front Loading Manual Feed: 0.5-1.5 mm (19.6-59.0 mil)<br>With Optional Roll Unit: 0.07-0.8 mm (2.8-31.4 mil) |
| Maximum Roll Print Length | With Optional Roll Unit: 59 Feet (18 meters)[3] |
| Maximum Media Roll Diameter | With Optional Roll Unit: 5.9" (150 mm) |
| Borderless Printing Width | With Optional Roll Unit: 10" (254 mm), B4 (257 mm), A3+ (329 mm), 14" (356 mm), 16" (407 mm), A2 (420 mm), A2+/17" (432 mm) |
| Paper Feed Method | Top Loading Manual Feed: One sheet, front output<br>Front Loading Manual Feed: One sheet, front output<br>Roll Feed (Optional): One Roll, front output |
| Languages | Language: GARO (Canon Proprietary) |
| Noise Level Approx | Operation: 52 dB (A) or less<br>Standby: 35 dB (A) or less<br>Acoustic Power: 6.6 Bels |
| Physical Dimensions | 12.5" (H) × 32.2" (W) × 28.9" (D) |

APPENDIX A-continued

Specifications
Main Unit Specs

| | |
|---|---|
| Weight | Approximately 86 lbs. |
| Power Source | AC-100-120 V (50-60 Hz) |
| Power Consumption | Maximum: 100 W or less<br>Standby 6 W or less |
| Operating Environment | Temperature: 59°-86° F. (15°-30° C.)<br>Relative Humidity: 10-80% (No Condensation) |
| User-replaceable items | Print Head (PF-03)<br>Ink Tanks (PFI-102)<br>Maintenance Cartridge (MC-05) |
| Software Included | Canon Printer Driver, Digital Photo Front-Access Printer, Driver Extra Kit (Free Layout, imageRUNNER Linking Function), HDI Driver for AutoCAD[4], PosterArtist Lite (PC only), Print Plug-in for Microsoft ® Word/Excel/PowerPoint (PC only) |

What is claimed is:

1. A process of producing printed decorations, comprising:
providing a gumpaste mixture;
sheeting the mixture to one or more predetermined thicknesses;
creating a plurality of blanks from the mixture;
manually arranging the plurality of blanks onto a platen of a printer;
scanning, by the printer, the platen for an orientation of each blank on the platen;
causing automatic adjustment, responsive to the scanning, of at least one of an orientation of the platen and a height of a printhead of the printer;
automatically printing a pattern on the plurality of blanks with the printer;
after the printing, manually removing the plurality of blanks from the platen; and
shaping each blank of the plurality of blanks into a shape of a decoration.

2. The process according to claim 1, wherein the shaping includes adding additional elements to each of the plurality of blanks to create the decoration.

3. The process according to claim 1, wherein manually arranging the plurality of blanks onto a platen of a printer comprises:
manually arranging each blank of the plurality of blanks onto a removable carrier having one or more visual markers; and
loading the removable carrier onto the platen of the printer.

4. The process according to claim 3, wherein the removable carrier is an aluminum tray.

5. The process according to claim 1, wherein the shape of the decoration is a bow.

6. The process according to claim 5, wherein the shaping includes:
bunching up each end of the blank;
wrapping each end of the blank around a cylindrical object; and
wrapping a ribbon around a center of the blank.

7. The process according to claim 1, wherein the printing includes printing an augmented reality marker on at least one of the plurality of blanks.

8. The process according to claim 1, wherein the gumpaste mixture includes about 50% by weight to about 60% powder sugar, about 25% to about 35% tapioca flour, about 4.5% to about 6.0% palm kernel flakes, about 3.5% to about 5.0% water, about 0% to about 0.5% potassium sorbate, and about 0% to about 0.5% edible ink.

9. The process according to claim 1, wherein the printer rides on a rail system to articulate over the platen.

10. The process according to claim 1, wherein the platen is articulated on a rail system with respect to the printer.

11. The process according to claim 1, wherein the printer performs laser-guided scanning.

12. The process according to claim 1, wherein the scanning, and the causing automatic adjustment occurs during the printing.

13. A method of producing printed decorations, comprising:
providing a gumpaste mixture;
sheeting the mixture to one or more predetermined thicknesses;
creating a plurality of blanks from the mixture;
arranging each blank of the plurality of blanks onto one or more visual markers on a platen of a printer configured to print with edible ink;
scanning, by the printer, the plurality of blanks for correct positioning upon the one or more visual markers;
responsive to the scanning, causing automatic adjustment of an orientation of at least one of the platen and a printhead of the printer;
automatically printing a pattern on the plurality of blanks with the printer;
after the printing, removing the plurality of blanks from the platen; and,
shaping each blank of the plurality of blanks into a shape of a decoration.

14. The method according to claim 13, wherein sheeting the mixture comprises passing the gumpaste mixture through a sheeting machine to obtain the one or more predetermined thicknesses.

15. The method according to claim 13, wherein the one or more visual markers are created on a tray with edible markings defining placement positions for each of the plurality of blanks.

16. The method according to claim 13, wherein creating the plurality of blanks comprises cutting the plurality of blanks using a cutting machine.

17. The method according to claim 13, further comprising drying the shaped decoration in an oven.

18. The method according to claim 17, wherein a drying temperature is between 65 to 70 degrees Celsius.

19. The method according to claim 13, wherein the printed decoration is a marker configured to initiate an augmented reality experience.

20. The method according to claim 13, wherein causing automatic adjustment of the orientation of at least one of the platen and the printhead comprises causing simultaneous adjustment of the platen and the printhead.

* * * * *